United States Patent [19]

Ahern et al.

[11] Patent Number: 4,926,806

[45] Date of Patent: May 22, 1990

[54] TWO-FLUID FUEL INJECTED ENGINES

[75] Inventors: Steven R. Ahern, Claremont; Roy S. Brooks; Martin J. P. Cebis, both of South Perth, all of Australia

[73] Assignee: Orbital Engine Co., Proprietary Limited, Balcatta, Australia

[21] Appl. No.: 313,831

[22] Filed: Feb. 23, 1989

[30] Foreign Application Priority Data

Feb. 25, 1988 [AU] Australia .................... PI6956

[51] Int. Cl.$^5$ .................... F02M 67/02; F02D 41/06
[52] U.S. Cl. .................... 123/179 L; 123/305; 123/491; 123/531
[58] Field of Search .................... 123/179 L, 491, 531, 123/532, 533, 534, 305

[56] References Cited

U.S. PATENT DOCUMENTS 4,262,645  4/1981  Kobayashi et al. ............ 123/179 L
4,771,754  9/1988  Reinke ........................ 123/533
4,800,862  1/1989  McKay et al. ................. 123/531

Primary Examiner—Andrew M. Dolinar
Attorney, Agent, or Firm—Armstrong, Nikaido, Marmelstein, Kubovcik & Murray

[57] ABSTRACT

A method and apparatus of controlling the direct injection of fuel directly into the combustion chamber of an engine by a charge of gas, wherein the control of the timing of injection of the fuel includes at the commencement of start up of the engine, adjusting the timing of injection so injection occurs at a timing earlier in the combustion chamber cycle than the normal timing of injection for idle running; and in response to the engine reaching a predetermined speed or rotation during start up, the timing of injection is progressively adjusted each engine cycle towards the normal timing of injection at idle running.

21 Claims, 3 Drawing Sheets

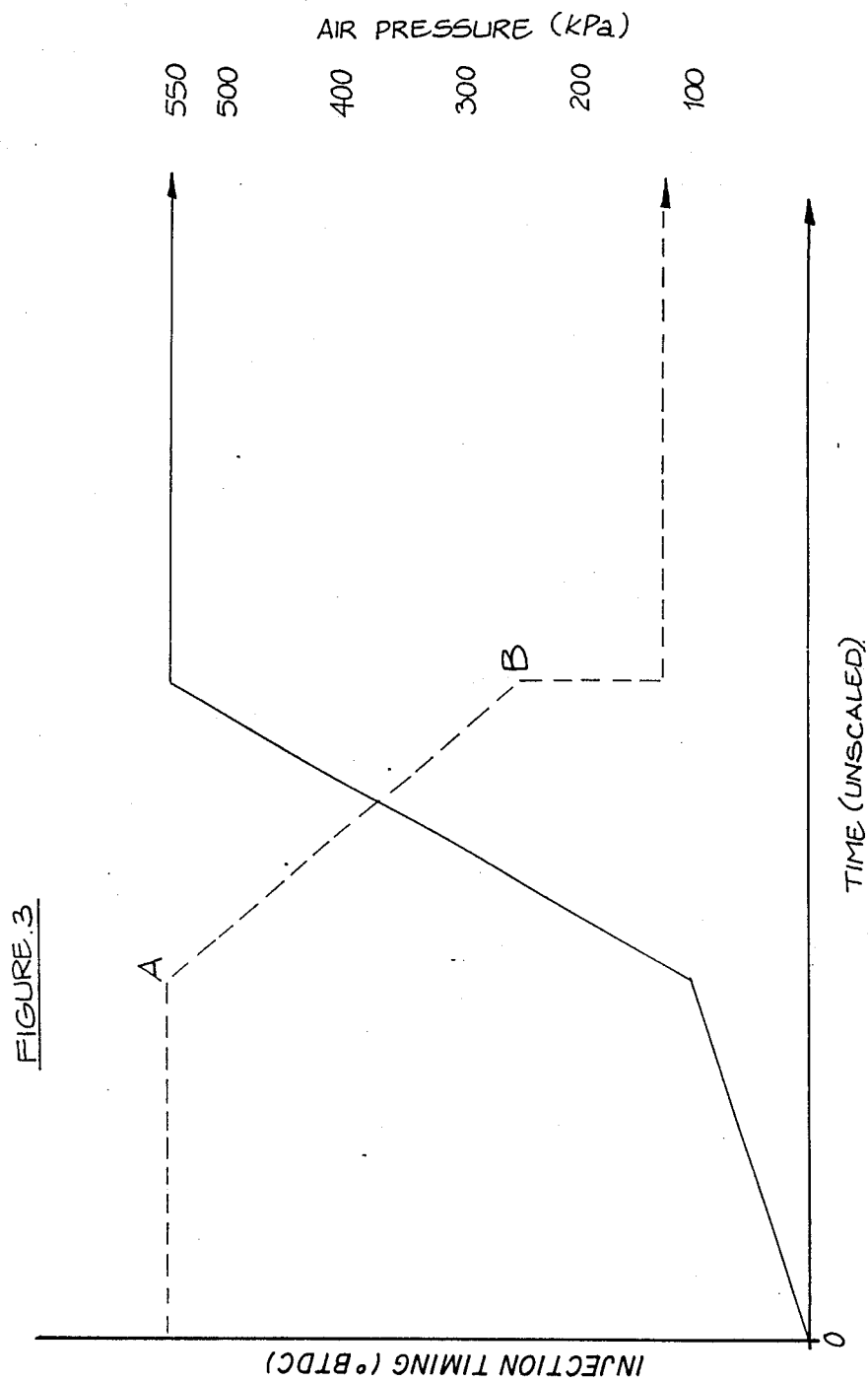

TWO-FLUID FUEL INJECTED ENGINES

This invention relates to fuel injected internal combustion engines wherein the fuel is injected directly into the combustion chamber in timed relation to the engine cycle, the fuel being delivered entrained in a gas with the pressure of the gas sufficient to effect the delivery of the fuel.

Fuel injection systems of the two-fluid type, that is, where a metered quantity of liquid fuel is delivered to the engine by a pulse of gas, such as air, the pressure of the gas available must be such that there is an adequate pressure difference between the gas delivering the fuel and the gas in the environment where the fuel is to be delivered. In manifold injected engines the fuel is delivered by the gas into the manifold where normally a sub-atmospheric pressure exists, whilst in direct injected engines, the fuel must be delivered into the combustion chambers of the engine, normally during the compression stroke when an above atmospheric pressure will exist of the order of 200 to 500 kPa. The compressed gas supply, such as air, is usually provided by a compressor driven by the engine, and for economic reasons, there is a minimum storage capacity for the compressed gas, and the compressor output is closely matched to the requirements of the fuel injection system, with only a limited excess.

It will therefore be appreciated that during start up of the engine, the gas pressure available may frequently be below the normal operating pressure and this may result in a lag in start up of the engine. In this regard, it should be noted that in order to have customer acceptability an auto or marine engine is required to start up with a minimum of cranking time. This requirement may be difficult to achieve with a two fluid fuel injection system when the engine has been not operating for a significant period, that is a period sufficient to allow the pressure of the gas available to effect injection of the fuel to have fallen substantially, due to inherent leakages in the gas supply system which cannot be effectively avoided.

It is also to be understood that the degree of the pressure drop experienced by the fuel/gas mixture during delivery to the engine contributes significantly to the atomisation of the fuel, particularly liquid fuel, and hence to the ignitability of the charge in the engine combustion chamber. Thus, under conditions where the pressure of the gas is below the desired working pressure at the commencement of start-up, the atomisation of the fuel will be adversely affected, and consequently the ignitability of the fuel/air charge will be reduced. It will be appreciated that such reduction in ignitability of the fuel/air mixture may further contribute to lengthening of the start up time of the engine.

It is therefore the object of the present invention to provide a method of injecting fuel and a fuel injection system for an internal combustion engine wherein provision is made to contribute to rapid start up of the engine under adverse fuel supply conditions.

With this object in view, there is provided according to the present invention a method of controlling the injection of fuel directly into the combustion chamber of an engine comprising injecting a metered quantity of fuel into the combustion chamber by a charge of gas at an above atmospheric pressure, and controlling the timing of said injection of the fuel in relation to the combustion chamber cycle whereby:

(1) the timing of injection when the engine is idling is preset, (2) at the commencement of start up of the engine, the timing of injection is adjusted to occur at a preselected timing earlier in the combustion chamber cycle than said preset timing of injection at idle, (3) in response to the engine reaching a predetermined speed of rotation during start up, the timing of injection is progressively adjusted each engine cycle towards said preset injection timing at idle during a time interval of between 0.2 to 0.5 seconds commencing from the engine attaining said predetermined speed; and (4) thereafter adjusts the timing of injection in accordance with the engine speed and/or load.

There is also provided a fuel injection system for an internal combustion engine, wherein a metered quantity of fuel is injected directly into the combustion chamber by a charge of gas at an above atmospheric pressure, said system including means to control the timing of injection of the fuel in relation to the combustion chamber cycle, said timing of injection control means being arranged to:

(1) effect injection of the fuel at a preset time in the combustion chamber cycle when the engine is idling;

(2) to adjust the timing of injection for commencement of start up of the engine to occur at a preselected timing earlier in the combustion chamber cycle than said preset idle timing of injection, (3) in response to the engine reaching a predetermined speed of revolution during start up, for each engine cycle progressively adjust the timing of injection towards said preset injection timing for idle during a time interval of between bout 0.2 and 1.0 seconds, preferably between about 0.2 and 0.5 seconds commencing from the engine attaining said predetermined speed; and (4) thereafter adjust the timing of injection in accordance with the engine load and/or speed.

Normally the preselected injection timing is up to 60° earlier in the combustion chamber cycle than the normal injection timing at idle preferably in the range of 40° to 60° prior to injection timing at idle.

Conveniently, the rate of progressive adjustment of the timing of injection after the engine has reached the predetermined speed of rotation towards the preset injection timing at idle is at a rate of between 1° and 3° of crank angle per cycle of the engine, preferably 2°.

The engine normally would be cranked by the starter motor during start up at a speed of the order of 200 to 400 rpm, depending on starter battery condition, while normal idle speed of the engine will be of the order to 700 to 1200 rpm, depending on engine characteristics.

The means to control the timing of the injection of the fuel during start up may be arranged so that once the engine has been brought up to predetermined speed related to normal idling speed, such as of the order to 700 to 1200 rpm, the injection timing will commence to return to the preset timing for normal idle, as the engine will have now driven the compressor through sufficient cycles to have the gas up to normal operating pressure.

The timing of injection may be controlled by an appropriate electronic control unit (ECU), as is customarily used in fuel injection systems to control injection timing throughout the full operating load and speed range of the engine. The present invention may be incorporated into the program of that ECU so that the adjustment of the injection timing will occur in response to the initiation of revolution of the engine, which indicates that cranking for engine start up has commenced. Alternatively the ECU may be programmed to respond to zero rotation of the engine and effect adjustment of the injection timing to ready the engine for the next start up operation.

As is standard practice in ECU controlled fuel injection systems, the engine is fitted with an appropriate sensor to detect each revolution or equal parts of a revolution of the engine. This sensor provides the appropriate indication that the cranking of the engine has commenced and that the injection timing should be adjusted to or held in the adjusted preselected start up timing. It also indicates when the engine has reached the predetermined speed at which the injection timing should commence to return to the normal idle setting, and also provides the required revolution countdown to effect the progressive adjustment of the injection timing, at the set rate per engine cycle.

In a typical two fluid fuel injection system, for a spark ignition the engine running at conventional compression ratios, the gas supply for the injection of the fuel is normally maintained at a pressure between 450 to 650 kPa. If the gas pressure is below about 450 kPa there will be insufficient pressure to effect delivery and atomise the fuel against the compression pressure in the combustion chamber when the injection timing is at the normal preset idle timing. In the present invention the injection of the fuel is timed to occur earlier in the compression stroke of the combustion chamber, when the compression pressure is lower, and the fuel can be effectively injected and atomised.

If the engine injection timing is returned to the preset idle timing in a single step, during initial start up conditions, when the pressure of the gas supply may still be low, stalling of the engine is likely to occur. Also the engine has difficulty in continuing to run when a change in injection timing of the order to 40° to 60° is made in a single step, particularly during start up, and consequently may stall. Accordingly, as proposed by the present invention, there is a progressive controlled rate of return of the injection timing from the preselected start up timing to the normal preset idle timing, so as to ensure there is not a sudden change in injection timing before the engine has settled into an operating condition.

However, it must also be taken into account that if the preselected early start up injection timing were to be maintained for too long a period after the engine has started, and the gas system has reached normal pressure, the engine speed would rapidly rise above normal idle speed, potentially of undesirable operating speed so soon after start up. This possibility is prevented by limiting the time interval from the reaching of the preset speed to the return to idle injection timing.

Accordingly, the present invention provides an effective control over the injection timing to achieve rapid start up of the engine and then a progressive adjustment of the injection timing so that the engine will remain running once started and will progress smoothly and without over-revving to the normal idle running condition. The invention above described is applicable to engines operating on either the two stroke or four stroke cycle, and to engines for any use including automotive and marine engines.

In this specification, reference is made to an engine cycle and a combustion chamber cycle. The term "combustion chamber cycle" is the sequence of intake of charge, compression of charge, expansion of charge and exhaust of charge for a particular combustion chamber (cylinder) of an engine. The combustion chamber cycle is individual to a particular combustion chamber and in a multi-combustion chamber engine, the combustion chamber cycle of respective combustion chambers overlap in time.

The term "engine cycle" is the total of single sequences of combustion chamber cycles of all combustion chambers of an engine. In a single cylinder engine the combustion chamber cycle and the engine cycle are the same. In a two stroke cycle engine each combustion chamber cycle and the engine cycle occupy one revolution of the engine, while in a four stroke cycle engine, they each occupy two revolutions.

The invention will be more readily understood from the following description of one practical arrangement of the method and system of fuel injection for an internal combustion engine with reference to the accompanying drawings.

In the drawings:

FIG. 3 is a composite graph illustrating the variations in injection timing and air pressure in relation to time from commencement of engine start up.

Figure 1:
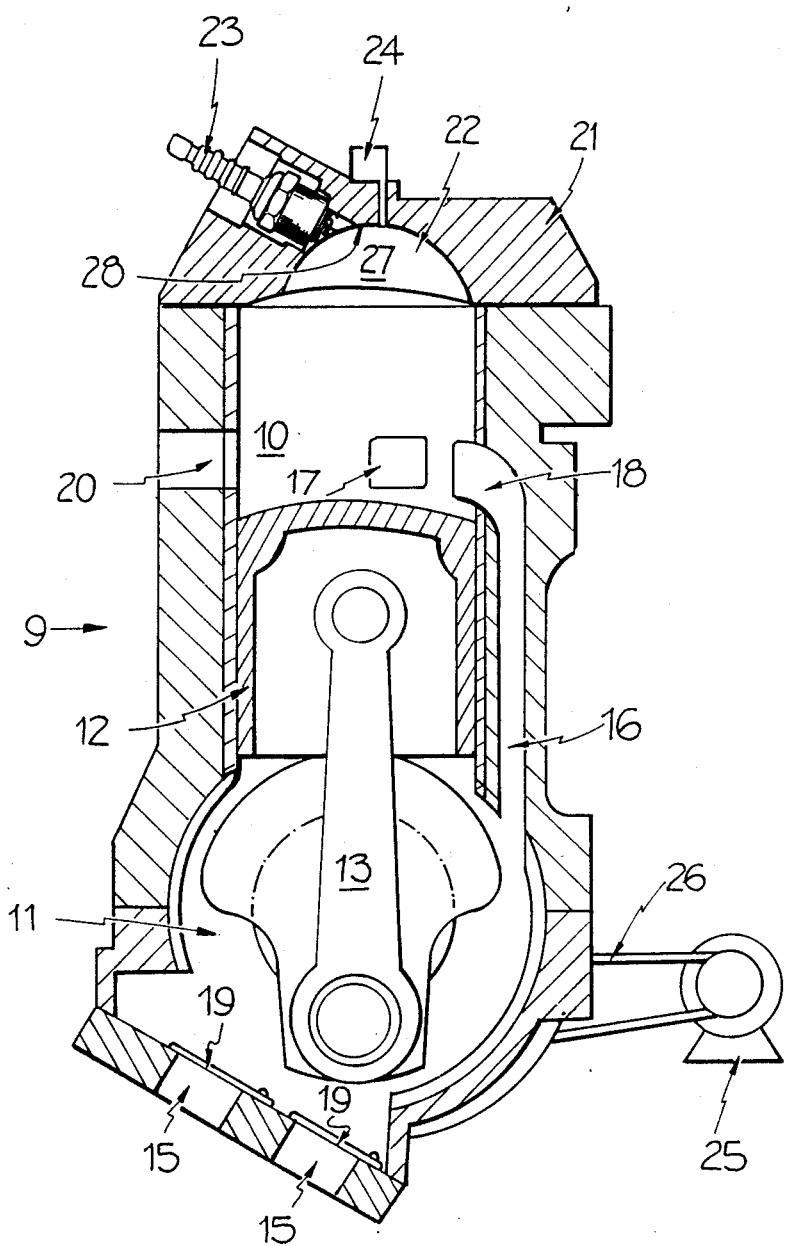
FIG. 1 is a sectional elevation of one cylinder of a two stroke cycle internal combustion engine.

Referring now to FIG. 1, the engine 9 is a single cylinder two stroke cycle engine, of generally conventional construction, having a cylinder 10, crankcase 11 and piston 12 that reciprocates in the cylinder 10. The piston 12 is coupled by the connecting rod 13 to the crankshaft 14. The crankcase is provided with air induction ports 15, incorporating conventional reed values 19, and three transfer passages 16 (only one shown) communicate the crankcase with respective transfer ports, two of which are shown at 17 and 18, the third being the equivalent to 17 on the opposite side of port 18. The engine 9 drives an air compressor 25 such as by the belt 26 from the engine crankshaft 14.

The injector 24 is located at the deepest part of the cavity 22, in the cylinder head 21, while the spark plug 23 projects into the cavity 22 at the face of the cavity remote from the transfer port 18. Accordingly, the air charge entering the cylinder will pass along the cavity past the injector 24 toward the spark plug 23, and so carry the fuel from the nozzle to the spark plug.

Figure 2:
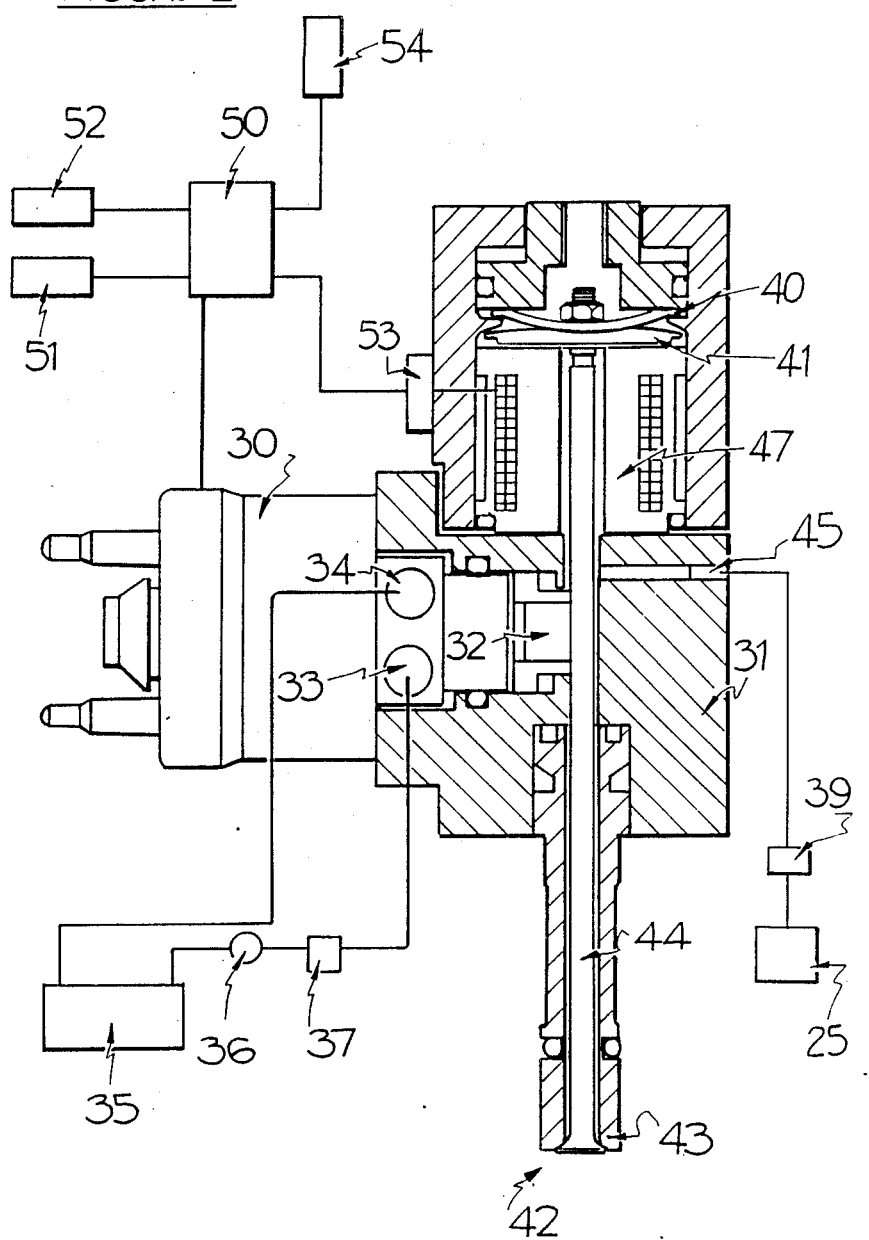
FIG. 2 is an elevation, partly in section, of a fuel metering and injector unit for use in the engine shown in FIG. 1.

The injector 24 is an integral part of a fuel metering and injection system whereby fuel entrained in air is delivered to the combustion chamber 27 of the engine by a pressurized air supply. One particular form of such a fuel metering and injection unit is illustrated in FIG. 2 of the drawings.

The fuel metering and injection unit incorporates a suitable commercially available metering device 30, such as an automotive type throttle body injector, coupled to an injector body 31 having a holding chamber 32 therein. Fuel is drawn from the fuel reservoir 35 by the fuel pump 36, preferably driven by the engine 9, via the pressure regulator 37 and delivered through fuel inlet port 33 to the metering device 30. The metering device, operating in a known manner, meters an amount of fuel into the holding chamber 32 in accordance with the engine fuel demand. Excess fuel supplied to the metering device is returned to the fuel reservoir 35 via the fuel return port 34. The particular construction of the fuel metering device 30 is not critical to the present invention and any suitable device may be used.

In operation, the holding chamber 32 is pressurised by air supplied from the air compressor 25 via pressure regulator 39 and air inlet port 45 in the body 31. Injection valve 43 is actuated to permit the pressurised air to discharge the metered amount of fuel through injector nozzle 42 into a combustion chamber 27 of the engine. Injection valve 43 is of the poppet valve construction opening inwardly to the combustion chamber, that is, outwardly from the holding chamber.

The injection valve 43 is coupled, via a valve stem 44, which passes through the holding chamber 32, to the armature 41 of solenoid 47 located within the injector body 31. The valve 43 is biased to the closed position by the disc spring 40, and is opened by energising the solenoid 47.

Further details of the operation of this fuel injection system is disclosed in U.S. Pat. No. 4693224, the disclosures of which are incorporated herein by reference.

The energising of the solenoid 47 is timed in relation to the combustion chamber cycle by a suitable electronic processor 50. The processor receives an input signal from the engine speed sensor 51, which signal is indicative of the engine speed of rotation and also identifies a reference point in the combustion chamber cycle in respect of which operations may be timed in relation to the engine and/or combustion chamber cycle. The processor 50 also receives a signal from the load sensor 52 which signal is indicative of the air flow rate in the engine air induction system. The processor is programmed to determine, from the air flow rate signal, the fuel requirement of the engine, and control the fuel metering device 30 accordingly to deliver the required amount of fuel to the holding chamber 32.

The processor 50 is further programmed to determine from the speed and load conditions of the engine the required timing of the injection of the fuel into the combustion chamber, and of the ignition thereof by the spark plug 23.

Conveniently the processor 50 incorporates a multi-point map designating the required injection timing for a range of engine loads and speeds, these having been determined from tests carried out to obtain required engine power and exhaust emission levels. The processor 50 is similarly programmed to determine and control the ignition timing of the engine in relation to engine load and speed.

The processor provides appropriate signals to the injector actuator 53 and ignition actuator 54, in accordance with the determinations, to energise the solenoid 47 at the required time for fuel injection, and to activate the spark plug 23 at the required time for ignition. The general construction of the load and speed sensors suitable for use as above indicated are well known in the industry, as are processors for performing the functions required by the processor 50.

Incorporated in the program of the processor is an instruction to set the timing of the injection of the fuel and the activation of the spark plug at preset timings in the combustion chamber cycle when the engine is in an idle condition, with no external load applied to the engine. A typical timing for the injection of fuel to a two stroke cycle when idling is 30° to 35° before top dead centre (BTDC) position of the piston 12 in the combustion chamber 27. The processor may typically detect the existence of the idle condition in the conventional manner by a signal indicating that the throttle valve in the conventional air intake passage of the engine is in the closed position.

In order to practice the present invention, the processor must also be able to determine when the engine is commencing a start up procedure and this may conveniently be achieved by the processor being programmed to detect when the engine crankshaft is stationary, that is, when it is rotating at zero rpm. This can readily be achieved by the processor detecting that it has not received a signal from the engine speed sensor for a selected period of time, such as for half a second. The processor having detected a zero rpm condition is programmed to then set the injection timing so as to occur at a predetermined timing in the combustion chamber cycle, that is earlier than the idle injection timing, by up to as much as 50° to 60° in readiness for whenever the engine is next started up. Although this adjustment to the fuel injection timing is effected after the engine has stopped, it will be appreciated that it is common practice to maintain the processor activated for a short period after stopping of the engine, by the provision of a suitable delayed switch in the power supply to the processor.

Upon initiation of the next start up procedure for the engine, the timing of injection will be at this earlier point in the combustion chamber cycle, e.g., 85° BTDC and thus during start up the fuel will be injected into the combustion chamber when there is a relatively low pressure therein. The processor is further programmed so that this injection timing will be retained until the engine has reached a predetermined rotational speed, such as for example, 1200 rpm.

Upon the processor detecting that the predetermined speed has been attained, it commences to retard the timing of injection towards the normal injection timing at idle. This retarding of the injection timing is at a set rate, such as 2° of crank angle each cycle of the engine, and continues over a fixed interval of time programmed into the processor, commencing from when the engine attained the predetermined speed. In the above example, where the predetermined speed is 1200 RPM, the fixed period of time, may be half a second, which would mean a retardation in the timing of the injection by approximately 20°.

At the elapse of this half second, the injection timing will be returned in a single step to the normal injection timing for the engine when running at idle speed. After the engine has returned to this condition, the injection timing will be varied in the normal manner in accordance with the load and speed conditions of the engine, as is conventional practice.

In the above programming of the processor, the predetermined speed at which the processor commences to return the injection timing to the idle injection timing is a speed considerably in excess of the maximum cranking speed of the engine, so that detecting the attainment of this predetermined speed is verification that the engine has fired and commenced to run independently of the cranking mechanism.

FIG. 3 of the accompanying drawings is a graphical representation of the injection timing and of the build-up in the pressure of the air supply from the compressor plotted against time measured from the commencement of cranking until full pressure is attained, and the injection timing has been returned to the normal idle timing. The air pressure is shown as the full line plot, and the injection timing as the broken line plot. It is to be noted that for the purpose of clarity, the injection timing and time axes, are not to scale.

It will be noted that as cranking of the engine commences, the air pressure increases, however, once the engine fires and commences running, the pressure increases rapidly until the normal operating pressure of 550 kPa is attained. At this pressure a conventional regulator operates to maintain the pressure at substantially 550 kPa. It is further noted that at the commencement of cranking, the timing of injection is early in the compression stroke, and remains at this timing until the engine fires and the rotational speed of the engine rapidly increases. From this point, as represented at "A" on FIG. 3, the timing of injection is progressively retarded at a fixed rate over an interval of time, and at the expiry of that time, as indicated by "B" in FIG. 3, the injection timing is changed in a single step to the normal injection timing for the engine when operating at idle speed.

Throughout this specification, reference has been made to determinations of engine speed, and it is to be realised that modern engine management systems provide for determining the speed of rotation of the engine by the time interval between selected points defining part of a revolution of the engine. Thus references in the specification to speed determination are on the basis of such determinations being made at predetermined fractions of a revolution of the engine.

The timing of injection of the fuel may be specified on several bases, such as the commencement of the opening of the port through which the fuel is delivered to the engine, or the commencement of the energising of the device that effects opening of the port, such as a solenoid. Also timing of injection may be specified in relation to closing of the port or de-energising of the solenoid or like device. In this specification timing of injection is specified as the commencement of the opening of the port through which fuel is delivered to the engine.

The practical application of the invention has been described with reference to a two stroke cycle engine, however, the invention is also applicable to a four stroke cycle engine.

The claims defining the invention are as follows:

1. A method of controlling the injection of fuel directly into the combustion chamber of an engine comprising injecting a metered quantity of fuel into the combustion chamber by a charge of gas at an above atmospheric pressure, and controlling the timing of said injection of the fuel in relation to the combustion chamber cycle whereby:
   (1) the timing of injection fuel when the engine is idling is preset,
   (2) at the commencement of start up of the engine, the timing of injection is adjusted so injection occurs at a preselected timing earlier in the combustion chamber cycle than said preset timing of injection for idle,
   (3) in response to the engine reaching a predetermined speed of rotation during start up, the timing of injection is progressively adjusted each engine cycle towards said preset injection timing at idle during a time interval of between about 0.2 to 1.0 seconds commencing from the engine attaining said predetermined speed, and
   (4) thereafter adjusts the timing of injection in accordance with the engine speed and/or load.

2. A method as claimed in claim 1 wherein said time interval is about 0.2 to 0.5 seconds.

3. A method as claimed in claim 1 or 2, wherein said preselected timing of injection is up to about 60° earlier in the combustion chamber cycle than said preset timing of injection at engine idle.

4. A method as claimed in claim 3, wherein said progressive adjustment of the timing of injection toward the idle injection timing is initially at the rate of about 1° to 3° of crank angle per revolution of the engine during said time interval, and at the expiry of said time interval returns directly to said preset timing of injection at engine idle.

5. A method as claimed in claim 3, wherein said progressive adjustment of the timing of injection toward the idle injection timing is initially at the rate of about 2° of crank angle per revolution of the engine during said time interval, and at the expiry of said time interval returns directly to said preset timing of injection engine idle.

6. A method as claimed in claim 1 or 2, wherein said preselected timing of injection is between about 40° and 60° earlier in the combustion chamber cycle than said preset timing of injection at engine idle.

7. A method as claimed in claim 6, wherein said progressive adjustment of the timing of injection toward the idle injection timing is initially at the rate of about 1° to 3° of crank angle per revolution of the engine during said time interval, and at the expiry of said time interval returns directly to said preset timing of injection at engine idle.

8. A method as claimed in claim 6, wherein said progressive adjustment of the timing of injection toward the idle injection timing is initially at the rate of about 2° of crank angle per revolution of the engine during said time interval, and at the expiry of said time interval returns directly to said preset timing of injection at engine idle.

9. A method as claimed in claim 1 or 2, wherein said progressive adjustment of the timing of injection toward the idle injection timing is initially at the rate of about 1° to 3° of crank angle per revolution of the engine during said time interval, and at the expiry of said time interval returns directly to said preset timing of injection at engine idle.

10. A method as claimed in claim 1 or 2, wherein said progressive adjustment of the timing of injection toward the idle injection timing is initially at the rate of about 2° of crank angle per revolution of the engine during said time interval, and at the expiry of said time interval returns directly to said preset timing of injection at engine idle.

11. A method as claimed in claim 1 or 2, wherein the predetermined engine speed is about 800 to 1400 revolutions per minute.

12. A fuel injection system for an internal combustion engine, wherein a metered quantity of fuel is injected directly into the combustion chamber by a charge of gas at an above atmospheric pressure, said system including means to control the timing of injection of the fuel in relation to the combustion chamber cycle, said timing of injection control means being arranged to:
   (1) effect injection of the fuel at a preset time in the combustion chamber cycle when the engine is idling;
   (2) to adjust the timing of injection for commencement of start up of the engine, to occur at a preselected timing earlier in the combustion chamber cycle than said preset idle timing of injection,
   (3) in response to the engine reaching a predetermined speed of revolution during start up, for each engine cycle progressively adjust the timing of injection towards said preset injection timing for idle during a time interval of between about 0.2 and 1.0 seconds commencing from the engine attaining said predetermined speed; and (4) thereafter adjust the timing of injection in accordance with the engine load and/or speed.

13. A fuel injection system as claimed in claim 12, wherein the time interval is about 0.2 to 0.5 seconds.

14. A fuel injection system as claimed in claim 12 or 13, wherein said control means to timing of injection is arranged so said preselected timing for injection is up to about 60° earlier in the combustion chamber cycle than said preset timing of injection at engine idle.

15. A fuel injection system as claimed in claim 14, wherein said control means for timing of injection is arranged so said progressive adjustment of the timing of injection toward the idle timing of injection is initially at the rate of about 1° to 3° of crank angle per revolution of the engine during said time interval, and at the expiry of said time returns directly to said timing of injection at engine idle.

16. A fuel injection system as claimed in claim 14, wherein said control means for timing of injection is arranged so said progressive adjustment of the timing of injection toward the idle timing of injection is initially at the rate of about 2° of crank angle per revolution of the engine during said time interval, and at the expiry of said time returns directly to said timing of injection at engine idle.

17. A fuel injection system as claimed in claim 12 or 13, wherein the control means for timing of injection is arranged so said preselected timing of injection is between about 40° and 60° earlier in the combustion chamber cycle than said preset timing of injection at engine idle.

18. A fuel injection system as claimed in claim 17, wherein said control means for timing of injection is arranged so said progressive adjustment of the timing of injection toward the idle timing of injection is initially at the rate of about 1° to 3° of crank angle per revolution of the engine during said time interval, and at the expiry of said time returns directly to said timing of injection at engine idle.

19. A fuel injection system as claimed in claim 17, wherein said control means for timing of injection is arranged so said progressive adjustment of the timing of injection toward the idle timing of injection is initially at the rate of about 2° of crank angle per revolution of the engine during said time interval, and at the expiry of said time returns directly to said timing of injection at engine idle.

20. A fuel injection system as claimed in claim 12 or 13, wherein said control means for timing of injection is arranged so said progressive adjustment of the timing of injection toward the idle timing of injection is initially at the rate of about 1° to 3° of crank angle per revolution of the engine during said time interval, and at the expiry of said time returns directly to said timing of injection at engine idle.

21. A fuel injection system as claimed in claim 12 or 13, wherein said control means for timing of injection is arranged so said progressive adjustment of the timing of injection toward the idle timing of injection is initially at the rate of about 2° of crank angle per revolution of the engine during said time interval, and at the expiry of said time returns directly to said timing of injection at engine idle.

* * * * *